Dec. 16, 1969  A. C. GLASS  3,483,768

COLLAPSIBLE STEERING ASSEMBLY

Filed Aug. 17, 1967  3 Sheets-Sheet 1

ADOLPH C. GLASS
INVENTOR.

BY R. E. Beaugue
ATTORNEY

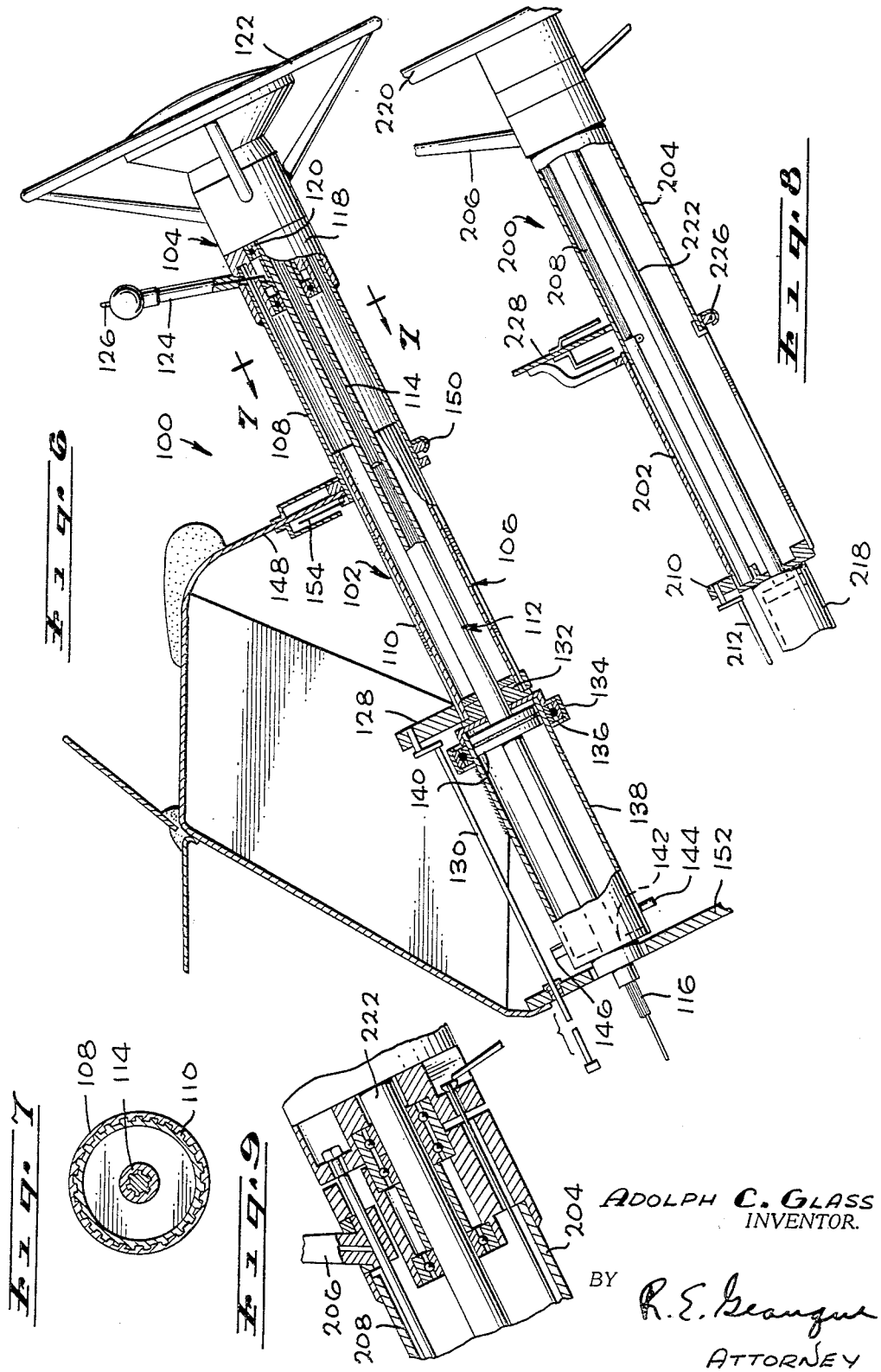

Dec. 16, 1969  A. C. GLASS  3,483,768
COLLAPSIBLE STEERING ASSEMBLY
Filed Aug. 17, 1967  3 Sheets-Sheet 3
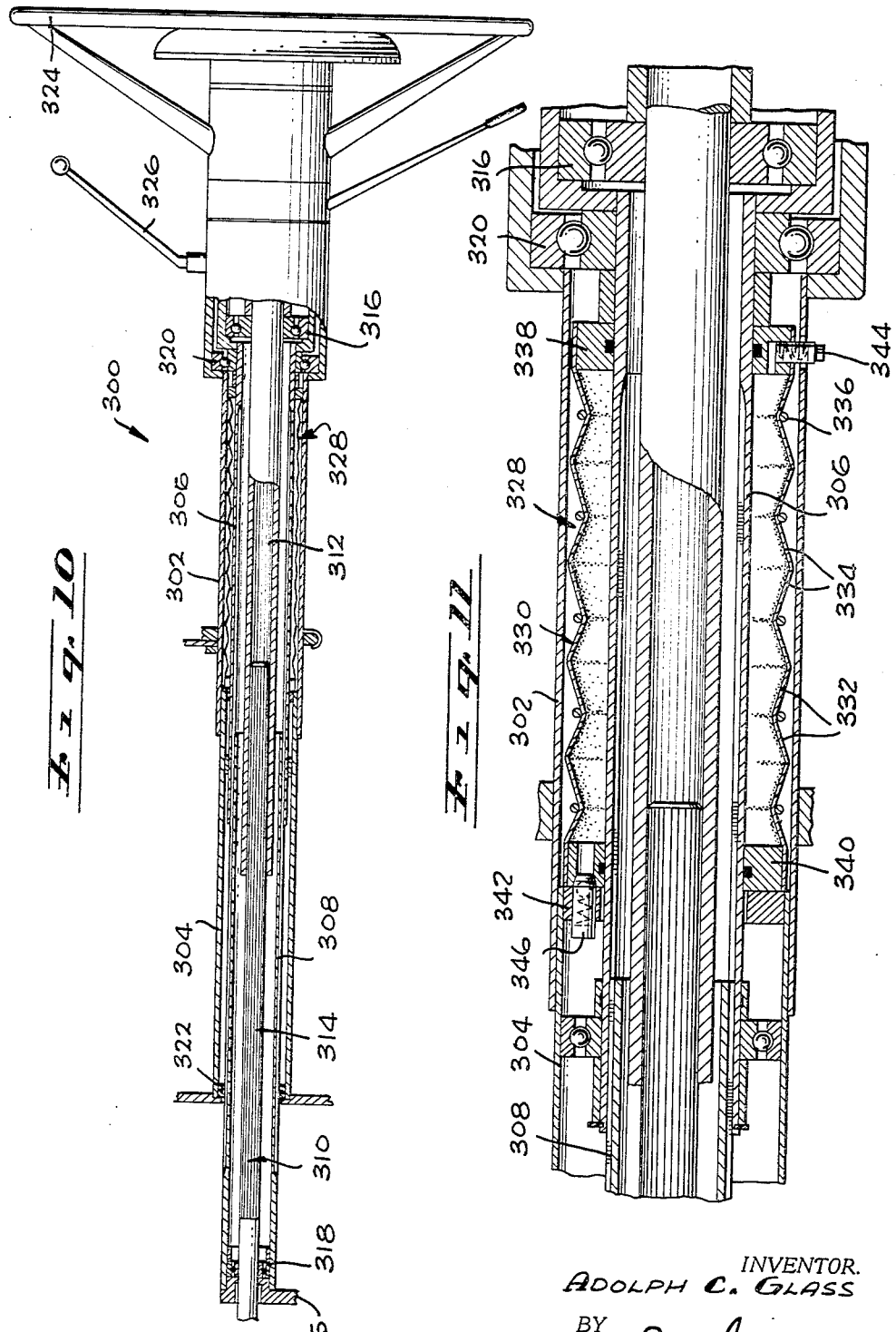
INVENTOR.
ADOLPH C. GLASS
BY
R. E. Geauque
ATTORNEY

United States Patent Office 3,483,768
Patented Dec. 16, 1969

3,483,768
COLLAPSIBLE STEERING ASSEMBLY
Adolph C. Glass, 20146 Hart St.,
Canoga Park, Calif. 91306
Continuation-in-part of application Ser. No. 511,874,
Dec. 6, 1965. This application Aug. 17, 1967, Ser.
No. 662,848
Int. Cl. B62d 1/18
U.S. Cl. 74—492                                12 Claims

ABSTRACT OF THE DISCLOSURE

A collapsible steering column for automotive vehicles is provided. The steering column has upper and lower telescoping sections defining a pneumatic chamber which is contracted by relative telescoping movement of the sections and opens to atmosphere through a pressure relief valve capable of retaining a pressure level in the chamber substantially greater than atmospheric pressure, such that the steering column collapses under impact and dissipates virtually all of the impact energy so as to avoid rebound of the column following impact. The steering column may be provided with means for initially pressurizing the pneumatic chamber to a pressure level greater than atmospheric pressure in order to pneumatically preload the steering column.

---

This application is a continuation-in-part of my co-pending application Ser. No. 511,874, filed Dec. 6, 1965, now abandoned and entitled Collapsible Steering Wheel Assembly.

This invention relates generally to automotive vehicles and, more particularly, to a novel collapsible steering assembly for motor vehicles.

The rapidly increasing number of motor vehicles on our streets and highways has resulted in greatly increased emphasis on motoring safety. Generally speaking, the current efforts to improve motoring safety are concerned, first, with reducing the number of traffic accidents by better driver education and improved highway design, and secondly, with minimizing the number of serious or fatal injuries sustained during those accidents which do occur by improved motor vehicle design. The present invention is concerned, generally, with this latter approach to improved motoring safety.

Most of the serious and fatal injuries sustained by occupants of motor vehicles during traffic accidents, particularly front end collosions, occur as a result of the occupants being thrown forwardly, by momentum, against some part of the vehicles. The driver of a motor vehicle, for example, is especially prone to serious or fatal injury by impact with the steering wheel or steering column. Seat belts are quite effective in minimizing passenger injuries of this type. However, in many traffic accidents, seat belts are ineffective to prevent injurious impact of the driver of a vehicle against the steering wheel or steering column owing to the close proximity of these parts to the driver's body.

It is a principal object of this invention to provide a novel collapsible steering assembly which minimizes or eliminates the possibility of serious or fatal injury to the driver of a vehicle as a result of impact of his body against the steering assembly during an accident.

A more specific object of the invention is to provide a collapsible steering assembly wherein the steering column is desiged to telescope in response to impact of the driver's body against the steering wheel or steering column, and wherein the force required to thus telescope the column is less than the threshold level of force which will cause injury to the average human body.

Another object of the invention is to provide a collapsible steering assembly wherein telescoping of the steering column during impact is resisted by novel non-rebound pneumatic shock-absorbing means embodied in the assembly, which means are effective to progressively dissipate the energy of the driver's body in such a way as to gradually arrest the body without serious damage.

A related object of the invention is to provide a collapsible steering assembly according to the foregoing object, wherein the pneumatic shock absorbing means may be pressurized to establish any desired pneumatic force level for resisting collapse of the assembly under load.

An important object of the invention is to provide a collapsible steering assembly wherein the pneumatic shock absorbing means comprise a novel compressible bellows.

Yet another object of the invention is to provide a collapsible steering assembly wherein the steering wheel is constructed of a frangible material surrounded by an outer resilient cushioning material, whereby the steering wheel will fracture under impact by the driver's body without serious injury to the driver.

A further object of the invention is to provire a collapsible steering assembly embodying a cushioned horn button which shields the driver's body against the injurious contact with the adjacent end of the steering column.

Yet a further object of the invention is to provide a collapsible steering assembly which is relatively simple in construction, economical to manufacture, reliable in operation, and is otherwise ideally suited to its intended purposes.

Other objects, advantages, and features of the invention will become readily evident as the description proceeds.

With these and such other objects in view, the invention consists in the construction, arrangement, and combination of the various parts of the steering assembly, whereby the objects contemplated are attained, as hereinafter set forth, pointed out in the appended claims, and illustrated in the accompanying drawings.

In these drawings:

FIGURE 6 is a longitudinal section through a modified collapsible steering assembly according to the invention, wherein the pneumatic shock absorbing means may be pressurized to establish any desired initial pneumatic force level for resisting collapse of the column under load;

FIGURE 7 is a section taken on line 7—7 in FIGURE 6;

FIGURE 8 is a fragmentary longitudinal section through a further modified collapsible steering assembly according to the invention;

FIGURE 9 is an enlarged fragmentary section through the upper end of the steering wheel assembly of FIGURE 8;

FIGURE 10 is a longitudinal section through a further modified and presently preferred collapsible steering assembly according to the invention; and FIGURE 11 is an enlarged fragmentary section of the steering assembly in FIGURE 10.

Figure 1:
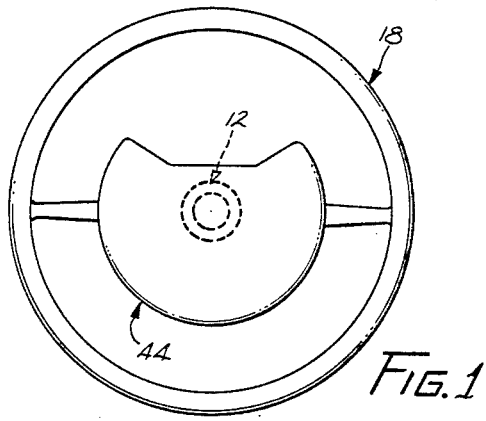
FIGURE 1 is a plan view of the steering wheel and horn button of a collapsible steering assembly according to the invention.
Figure 3:
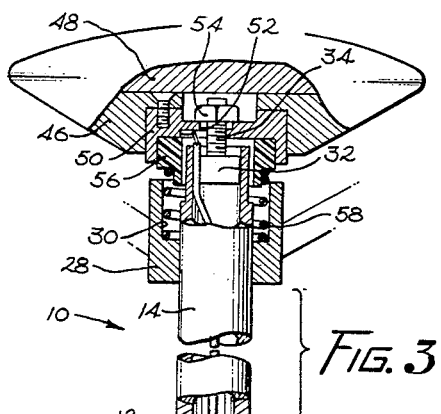
FIGURE 3 is an enlarged view similar to FIGURE 2 with parts broken away for the sake of clarity.
Figure 2:
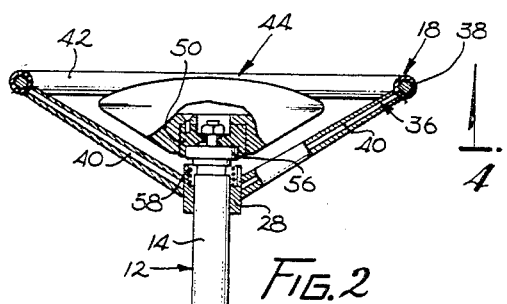
FIGURE 2 is a longitudinal section through the steering assembly.
Figure 5:
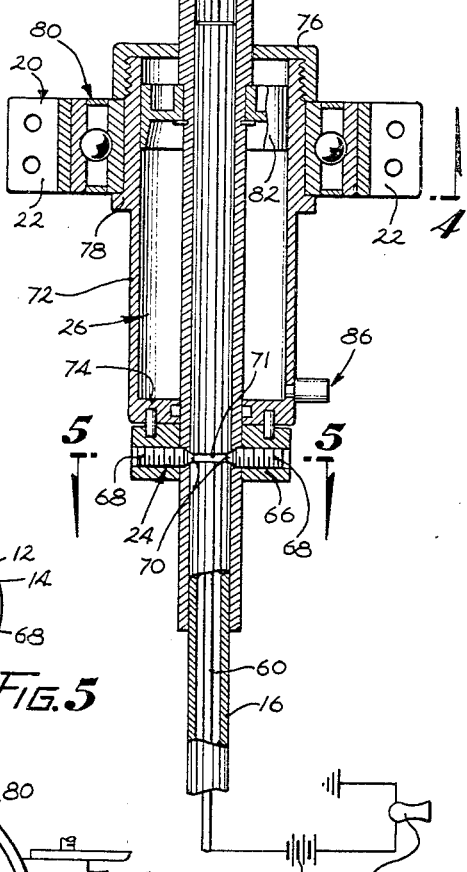
FIGURE 5 is a section taken on line 5—5 in FIGURE 3.
Figure 4:
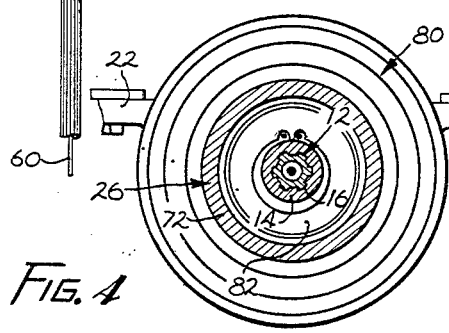
FIGURE 4 is a section taken on line 4—4 in FIGURE 3.

The collapsible steering assembly 10 of the invention which has been selected for illustration in FIGURES 1–5 of these drawings comprises a telescoping steering column 12 including a pair of telescoping steering shafts 14 and 16. As will appear presently, the steering shafts 14 and 16 are keyed against relative rotation. The lower shaft 16, as the steering assembly is viewed in the drawings, is a relatively axially fixed shaft, the lower end of which is adapted for connection to the steering arm (not shown) of a motor vehicle. The upper shaft 14 is a relatively axially movable shaft which supports, at its upper end, the steering wheel 18 of the steering assembly. The upper shaft 14 of the steering column 12 is supported by a mounting bracket 20 for rotation and axial movement relative to the bracket. This mounting bracket has apertured ears 22 to receive bolts for attaching the bracket to the dashboard of a motor vehicle. At this point, therefore, it is evident that when the steering wheel assembly 10 is installed on a motor vehicle, the shafts 14 and 16 of the steering column 12 are rotatable in unison by turning the steering wheel 18. The upper shaft 14 is adapted for telescoping movement relative to the lower shaft 16.

Telescoping movement of the upper shaft 14 of the steering column 12 toward the lower shaft 16 is resisted by a force responsive locking or detent means 24 and by a shock absorbing means 26. Locking means 24 normally retain the upper steering shaft 14 in its extended position of FIGURE 3 wherein the steering wheel 18 is disposed for normal steering control by the driver of the motor vehicle on which the steering wheel assembly 10 is installed. The locking means 24 release the upper steering shaft 14 for telescoping movement relative to the lower steering shaft 16 to a lower collapsed position, wherein the steering wheel 18 is located close to the dashboard of the vehicle, in response to impact of the driver's body against the steering wheel or upper shaft. As will appear presently, the locking means 24 release the upper shaft 14 for telescoping movement relative to the lower shaft in response to a downward axial force on the upper shaft less than the threshold level of force which will cause injury to the average human body. The shock absorbing means 26 yieldably resists telescoping movement of the upper steering shaft 14 from its upper extended position of FIGURE 3 to its lower collapsed position relative to the lower steering shaft 16, in response to impact of the driver's body against the steering wheel 18 or the upper steering shaft, in such a way as to progressively dissipate the energy of the impacting body and thereby gradually arrest the body without injury.

Referring now in greater detail to the steering wheel assembly 10, the upper shaft 14 of the steering column 12 will be observed to comprise an internally splined tubular shaft. The lower shaft 16 of the steering column is an externally splined tubular shaft which fits slidably within the lower end of the upper shaft. The splines on these shafts interengage to secure the shafts against relative rotation while permitting the upper shaft to move axially relative to the lower shaft, as described above. Coaxially fixed to the upper end of the upper steering shaft 14 is a sleeve 28. The upper end of this sleeve is counterbored to define an annular recess 30 between the sleeve and the upper end of the shaft 14. Fixed within the upper end of the upper steering shaft 14 is a plug 32 having a coaxial, upwardly extending and externally threaded stem 34. Stem 34 projects above the upper end of the shaft 14.

Steering wheel 18 comprises an inner wheel body 36 constructed of frangible plastic or other suitable frangible material. Wheel body 36 includes a ring 38 and a pair of diametrically opposed spokes 40 which extend generally radially between and are rigidly joined to the steering wheel ring 38 and the sleeve 28 on the upper end of the upper steering shaft 14. The entire body 36 of the steering wheel 18 is encased in an outer covering of cushioning material 42, such as soft rubber. Steering wheel 18 is designed to fracture or break under the force of an impact of the driver's body against the wheel without causing injury to the driver. It is evident that rotation of the steering wheel is effective to rotate in unison the upper and lower shafs 14, 16 of the steering column 12.

Coaxially disposed within the ring of the steering wheel 18 is a generally circular horn button 44. This horn button includes a lower, rigid body 46. Bonded to the upper surface of the body 46 is a resilient cushioning pad 48. If necessary to expose the instrument panel of the vehicle on which the steering wheel assembly is installed, the horn button 44 may be cut away in the manner illustrated in FIGURE 1. Coaxially secured to the underside of the body 46 of the horn button 44 is a metal ring 50. This ring has a central opening 52 which loosely receives the threaded stem 34 on the steering column plug 32. A nut 54 is threaded on the stem 34 above the ring 50 to retain the horn button 44 on the steering column 12. The underside of the ring 50 is counterbored to receive an electrical insulating ring 56 which loosely surrounds the upper end of the upper steering shaft 14. The insulating ring 56 may be press fitted in or otherwise secured to the metal ring 50. The lower end of the insulating ring 56 is externally reduced to define an annular seat for one end of a coil spring 58 which is disposed within the recess 30 in the upper steering column sleeve 28. The opposite end of the spring 58 seats against the sleeve 28.

Extending through the steering column 12 and an opening in the upper steering column plug 32 is an electrical lead 60. The upper end of this lead is connected to the metal horn button ring 50. The lower end of the lead is connected to one terminal of the vehicle horn 62 through the vehicle battery 64. The other terminal of the horn is grounded. When the steering wheel assembly is installed on a vehicle and the horn button 44 is depressed, the metal ring 50 on the button engages the upper end of the upper steering shaft 14, thereby grounding the lead 60 through the steering column 12 and completing an energizing circuit through the horn 62. As will appear presently, the horn button 44 serves the additional function of shielding the body of the driver against injurious contact with the upper end of the steering column 12.

The force responsive locking means 24 on the steering column 12 comprises a collar 66 fitted on the lower end of the upper steering shaft 14. Threaded in diametrically opposed bores in the collar 66 are inserts 68, the inner ends of which extend through aligned openings in the shaft 14. Inserts 68 contain spring-loaded detents 70 which resiliently engage in an external circumferential groove 71 in the lower steering shaft 16 to releasably secure the upper shaft in its extended position relative to the lower shaft.

The shock absorbing means 26 of the steering wheel assembly 10 comprises a cylinder 72 which coaxially surrounds the steering column 12, above the collar 66. The lower end of this cylinder is closed by an integral end wall 74. The uper end of the cylinder is open. A cap 76 is externally threaded on the upper cylinder end. The upper steering shaft 14 of the steering column 12 extends slidably through and is sealed by the illustrated O-ring to the lower cylinder wall 74. The upper shaft extends loosely through an enlarged opening in the cylinder cap 76. Externally formed on the cylinder 72 is a circumferential shoulder 78 which is axially spaced from the lip of the cylinder cap 76, as shown. Cylinder 72 extends coaxially through the mounting bracket 20 and is supported for rotation relative to the bracket and restrained against axial movement relative to the bracket by a combined radial and thrust bearing 80. The outer race of the bearing 80 is fixed within the central opening in the mounting bracket 20. The inner race of the bearing is clamped between the lip of the cylinder cap 76 and the cylinder shoulder 78. It is evident, therefore, that the cylinder 72 is free to rotate relative to the mounting bracket 20 but is restrained against axial movement relative to the bracket.

Fixed to the upper shaft 14 of the steering column 12, within the cylinder 72, is a piston 82. The upper shaft 14 and piston 82, therefore, are axially movable in unison relative to the cylinder. When the upper steering shaft 14 occupies its upper extended position of FIGURE 3, the piston 82 is located adjacent the cylinder cap 76. Upward axial movement of the upper shaft 14 to this extended position is limited by engagement of the shaft collar 66 with the lower cylinder wall 74. During downward telescoping movement of the upper steering shaft 14 relative to the lower steering shaft 16, the piston 82 approaches the lower cylinder end wall 74, thereby compressing the air in the lower end of the cylinder 72. The compressed air escapes to atmosphere through a pressure relief valve 86 which is set to open when the pressure in the cylinder increases to some preset level which will produce on the steering column a force in opposition to its telescoping movement less than that which will cause injury to the human body but sufficiently great to arrest the body, according to U.S. Government standards, this force is 1800 lbs.

The steering wheel assembly 10 is mounted on a motor vehicle by attaching the mounting bracket 20 to the dash panel of the vehicle and connecting the lower end of the lower steering column shaft 16 to the steering arm of the vehicle. During normal operating conditions of the vehicle, the upper shaft 14 of the steering column 12 is retained in its upper extended position of FIGURE 3 by the force responsive locking or detent means 24. In this position, the steering wheel 18 of the assembly is disposed for normal steering control by the driver of the vehicle. In the event of a collision which throws the driver's body forwardly into impact with the steering wheel 18 or the upper end of the steering column 12, the resilient detents 70 embodied in the locking means 24 yield out of the groove 71 in the lower steering shaft 16 to release the upper shaft 14 for downward telescoping movement relative to the lower shaft. This telescoping movement of the upper shaft drives the piston 82 downwardly in its cylinder 72, thereby compressing the air in the lower end of the cylinder and expelling the air to atmosphere through the cylinder orifice 84. Such compression of the air in the cylinder 72 and expulsion of the air to atmosphere through the cylinder orifice 84 retards telescoping movement of the upper steering shaft 14 in such a way as to progressively dissipate the energy of the impacting body of the driver and gradually arrest his body without injury. The padded horn button 44 provides a shield between the driver's body and the upper end of the steering column 12 which prevents injurious impact of the body against the steering column. As noted earlier, the steering wheel 18 is designed to fracture under impact by the driver's body without injury to the driver. In actual practice, the spring loading on the detents 70 of the force responsive locking means 24 is adjusted to effect release of the upper steering shaft 14 for downward telescoping movement relative to the lower steering shaft 16 in response to an axial impact force on the upper shaft less than the threshold level of force which will cause injury to the average human body.

Preferably, the cylinder 72 is keyed to steering column 12 for rotation therewith. To this end, pins 88 are press-fitted in the collar 66 and slidably engage in blind sockets in the lower cylinder wall 74. It is evident that pins 88 key the cylinder to the steering column when the latter is in its normal extended condition of FIGURE 3 while permitting telescopic contraction of the column in the event of impact of the driver's body against the steering wheel.

The modified steering assembly 100 illustrated in FIGURES 6 and 7 includes a telescoping steering column 102 having normally upper and lower telescoping sections 104 and 106. These telescoping sections have outer telescoping sleeves 108, 110. Extending centrally through the sleeves is a telescoping steering shaft 112 having slidably keyed upper and lower telescoping portions 114, 116. The upper shaft portion 114 is an internally splined sleeve and the lower shaft portion 116 is an externally splined shaft which slides in the splined sleeve. The upper end of the upper telescoping sleeve 108 is closed by an end cap 118 which is rigidily fixed to the sleeve. The upper steering shaft portion or sleeve 114 extends centrally through the end cap and is supported for rotation and against axial movement in the cap by bearings 120. Fixed to the protruding upper end of the steering shaft sleeve 114 is a steering wheel 122 like that described earlier. A shift lever 124 is rigidly fixed to and extends radially from the end cap 118. This lever contains a switch 126 for operating turn signals. The lower telescoping sleeve 110 fits slidably within and is keyed to the upper sleeve 108. Fixed to the lower end of the lower sleeve 110 is a shift arm 128 which is connected by linkage 130 to a shift mechanism (not shown) operable by rotation of the arm about the axis of the steering column.

Fixed in the lower end of the lower telescoping sleeve 110 is an end cap or plate 132 containing a central bearing through which the lower end of the splined steering shaft sleeve 114 extends slidably and rotatably. Plate 132 has a coaxial annular flange 134 in which is fixed the outer race of a ball bearing unit 136. The inner race of this bearing unit is fixed to the upper end of a pneumatic cushioning cylinder 138. Cylinder 138 is coaxially aligned with the telescoping sleeves 108, 110 and the steering shaft 112 and contains a piston 140 fixed to the steering shaft sleeve 114. The lower end of the sleeve is closed by an end wall 142 through which the lower end of the steering shaft sleeve extends slidably and rotatably. Cylinder 138 has an inlet fitting 144 for pressurizing the interior chamber of the cylinder with a pneumatic working fluid, such as air. The fitting includes a valve, such as a check valve, for sealing the fitting against leakage of working fluid from the cylinder. Cylinder 138 also has a pressure relief means 146 which is set to open, and thereby vent working fluid from the cylinder chamber, at some predetermined pressure level. In a typical steering assembly according to the invention, this pressure relief means is set to open at a pressure which produces on the steering column a force, in opposition to its telescoping movement, equal to that required by U.S. Government standards, which is 1800 lbs.

When the steering assembly is installed in an automotive vehicle, the lower end of the upper telescoping sleeve 108 is attached to the dash panel 148 by a breakaway joint 150 which restrains the sleeve against axial movement but permits the sleeve to turn. The lower end of the pneumatic cushioning cylinder is fixed to a frame wall 152 of the vehicle. Under normal conditions, the steering column is fully extended. Steering torque is then transmitted from the steering wheel 122 to the front ground wheels of the vehicle through the telescoping steering shaft 112. Shifting is accomplished by rotating the shift lever 124 about the axis of the steering column. This rotation of the lever rotates the telescoping sleeves 106, 108 which are keyed to one another, and thereby the shift arm 128 on the lower sleeve, to operate the shifting mechanism through the linkage 130. The position of the shift lever is indicated by a pointer 154 which is fixed to the upper sleeve 106 and rotates across a suitable dial plate, or the like, on the vehicle dash panel. In the event of an impact against the steering column, the upper column sleeve 104 and the upper steering shaft sleeve 114 are driven downwardly or forwardly in telescoping movement relative to the lower sleeve 110 and splined steering shaft 116. Such telescoping movement is resisted and cushioned by compression of the working fluid in the cushioning cylinder 138. As noted, this cylinder may be initially pressurized with working fluid to any desired pressure level through the inlet fitting 144, and the pressure relief means 146 may be set to open at any cylinder pressure. Typically, this pressure relief means is set to open at a pressure which produces the 1800 lb. force, referred to earlier, on the steering column in opposition to its telescoping movement and the cylinder is initially pressurized to a pressure level somewhat below this pressure relief level. In this way, the pneumatic cushioning cylinder produces the proper retarding force on a body striking the steering column immediately after impact without requiring substantial telescoping movement of the steering column to build up the pressure to the required level, as in the case of the cushioning means in FIGURES 1–5. From this standpoint, therefore, the steering assembly 100 is superior to the first described steering assembly according to the invention.

The modified collapsible steering assembly 200 illustrated in FIGURES 8 and 9 is similar to that just described and differs from the latter assembly only in the following respects. The lower telescoping sleeve 202 of the steering assembly 200 fits slidably over the upper sleeve 204. The shift lever 206 is connected to the upper end of a telescoping shifting shaft 208 which is rotatably supported at its ends in the steering column. Attached to the lower end of the shaft 208 is a shift arm 210 which extends through a circumferentially elongated slot in the lower sleeve 202 and is connected by linkage 212 to the shifting mechanism (not shown). The lower end of the lower telescoping sleeve 202 is attached directly to the upper end of the pneumatic cushioning cylinder 218.

The steering assembly 200 is otherwise essentially identical to the steering assembly 100 and functions in essentially the same manner as the latter assembly, except that in the steering assembly 200, shifting torque is transmitted to the shift linkage 212 through the inner telescoping shaft 208, rather than through the telescoping sleeves 202, 204, as in the steering assembly 100. It will be understood that the cushioning cylinder 218 has a pressurizing inlet and a pressure relief means like the cushioning cylinder of the steering assembly 100. During normal operation of the steering assembly 200, therefore, the steering column is fully extended and steering torque is transmitted from the steering wheel 220 to the front ground wheels of the vehicle through the inner telescoping steering shaft 222. In the event that the driver's body impacts the steering wheel, the break-away joint 226 between the steering column and the vehicle instrument panel 228 releases the upper section of the steering column for downward or forward telescoping movement relative to the lower section of the column. This telescoping movement of the steering column is resisted by the pressurized working fluid within the cushioning cylinder 218. As in the previous form of the invention, the pressure relief means of the cylinder opens, to vent working fluid from the cylinder, when the fluid is compressed to a pressure level which produces the requisite retarding force, i.e. 1800 lbs. on the steering column. The steering assembly 200 obviously possesses the same advantage as the steering assembly 100, that is, the advantage that the pressurized working fluid in the cushioning cylinder 218 is compressed to the proper working pressure immediately after impact, rather than by substantial telescoping movement of the column, as in the first described embodiment of the invention.

The modified collapsible steering assembly 300 illustrated in FIGURES 10 and 11 represents another form of the invention. This steering assembly comprises outer telescoping sleeves 302, 304, inner telescoping sleeves 306, 308, and a central telescoping steering shaft 310 having an upper portion or internally splined sleeve 312 and a lower portion or externally splined shaft 314 which slides in the splined sleeve. The steering shaft 310 is supported in the inner-telescoping sleeves 306, 308 by bearings 316, 318 in such a way that the upper splined sleeve of the shaft can turn relative to but is restrained against axial movement relative to the upper telescoping sleeves 302, 306. The inner telescoping sleeves 306, 308 are rotatably supported, in turn, in the outer telescoping sleeves 302, 304 by bearings 320, 322. Steering torque is transmitted from the steering wheel 324 to the front ground wheels of the vehicle through the telescoping steering shaft 310. Shifting torque is transmitted to the shift arm 325 through the inner telescoping sleeves 306, 308. To this end, the sleeves are slidably keyed to one another, as by interfitting splines on the sleeves, and the upper end of the upper sleeve 306 is operatively connected to a shift lever 326 which extends through an opening in the enlarged upper end of the outer telescoping sleeve 302 in such a way that swinging of the shift lever rotates the sleeves 306, 308 to operate the shift arm 325.

The pneumatic cushioning means 328 of the modified steering assembly 300 under consideration comprises a compressible pressure vessel having a wall 330 which encircles the inner telescoping sleeves 306, 308 in the region between these sleeves and the outer telescoping sleeves 302, 304. The vessel wall 330 is effectively corrugated to render this wall axially compressible. The wall of the illustrated pressure vessel, for example, is essentially a bellows which may be fabricated from thin sheet plastic or metal. The illustrated corrugated wall or bellows has axially spaced annular folds 332 defining adjacent annular sidewalls 334 which are joined along their inner end outer meeting edges in alternate fashion, as shown. Surrounding the bellows 330 at the intermediate edges of its adjacent sidewalls 334 are reinforcing rings 336. The upper end of the bellows 330 is closed by an annular wall 338 which is effectively fixed and sealed to the inner-telescoping sleeve 306. The opposite end of the bellows is closed by a similar annular wall 340 which is slidably sealed to the inner sleeve 306 and abuts a collar 342 which is fixed within the sleeve 304. Bellows 328 is equipped with a pressurizing inlet 344 and a pressure relief means 346 like the earlier steering assemblies of the invention.

In the event of an impact against the steering column of FIGURES 10 and 11, the column collapses or telescopes in much the same way as described in connection with the earlier steering assemblies of the invention. In the column of FIGURES 10 and 11, however, telescoping movement is resisted and compresses under load to compress the working fluid in the bellows.

It is evident, therefore, that the invention herein described and illustrated is fully capable of attaining the several objects and advantages preliminarily set forth. It is understood that the piston and cylinder assembly 26 of the first embodiment could be attached to the sleeve 306 of FIGURE 10 and replace the bellows type of device as the means for resisting the developing forces and thereby, the shift assembly will be incorporated in the first embodiment.

While a presently preferred embodiment of the invention has been disclosed for illustrative purposes, various modifications in the design, arrangement of parts, and instrumentalities of the invention are possible within the spirit and scope of the following claims.

What is claimed is:

1. A collapsible steering assembly for an automotive vehicle comprising:
    a telescoping steering column including upper and lower telescoping sleeves;
    means keying said sleeves against relative rotation while permitting relative telescoping movement of said sleeves;
    a telescoping steering shaft extending centrally through said sleeves and including upper and lower shaft sections;
    means keying said shaft sections against relative rotation while permitting relative telescoping movement of said sections;
    bearing means mutually joining the upper ends of said upper sleeve and upper shaft section for restraining against relative axial movement and permitting relative rotation of said upper shaft section and said upper sleeve;

bearing means mutually joining the lower ends of said lower sleeve and lower shaft section for restraining against relative axial movement and permitting relative rotation of said lower shaft section and said lower sleeve;

a shift lever secured to the upper end of said upper sleeve for rotating said sleeves;

a shift arm secured to the lower end of said lower sleeve and adapted for connection to the shift linkage of said vehicle; and yieldable cushioning means within said steering column for yieldably resisting telescoping movement of said upper sleeve and said upper shaft section relative to said lower sleeve and lower shaft section.

2. A collapsible steering assembly according to claim 1 including:

additional upper and lower telescoping sleeves surrounding said first mentioned sleeves;

bearing means mutually joining the upper ends of said upper sleeves and the lower ends of said lower sleeves for restraining said upper sleeves against relative axial movement, and permitting rotation of said first mentioned sleeves in unison relative to said additional sleeves.

3. A collapsible steering assembly for automotive vehicles comprising:

a telescoping steering column including normally upper and lower telescoping sections;

non-rebound yieldable total energy dissipating cushioning means operatively connected between said sections for yieldably resisting relative telescoping movement of said sections in a manner such that said cushioning means yields to accommodate relative telescoping movement of said sections in response to impact against said column of a moving mass which produces on said column an impact force at least equal to a predetermined force level;

said cushioning means including means for dissipating a major portion of the impact energy of said mass, such that substantially no energy is stored in any manner whatsoever within said steering assembly following impact and any energy which is not dissipated by the cushioning means and is effectively stored within said steering assembly following impact is insufficient to cause any appreciable rebound extension of said sections;

said cushioning means comprise a pneumatic chamber which is contracted by relative telescoping movement of said sections and is adapted to contain a pneumatic working fluid to be compressed by contraction of said chamber; and pressure relief means for normally retaining a pressure level substantially greater than atmospheric pressure in said chamber and venting working fluid from said chamber only in response to a pressure in said chamber exceeding said pressure level.

4. A collapsible steering assembly for automotive vehicles comprising:

a telescoping steering column including normally upper and lower telescoping sections;

non-rebound yieldable total energy dissipating cushioning means operatively connected between said sections for yieldably resisting relative telescoping movement of said sections in a manner such that said cushioning means yields to accommodate relative telescoping movement of said sections in response to impact against said column of a moving mass which produces on said column an impact force at least equal to a predetermined force level;

said cushioning means including means for dissipating a major portion of the impact energy of said mass, such that substantially no energy is stored in any manner whatsoever within said steering assembly following impact and any energy which is not dissipated by the cushioning means and is effectively stored within said steering assembly following impact is insufficient to cause any appreciable rebound extension of said sections;

said cushioning means comprise a pneumatic chamber which is contracted by relative telescoping movement of said sections;

means for pressurizing said chamber with a pneumatic working fluid at a given initial fluid pressure level when said sections are fully extended, whereby said working fluid is compressed to a higher pressure level by relative telescoping movement of said sections; and pressure relief means for normally retaining a pressure level substantially greater than atmospheric pressure in said chamber and venting working fluid from said chamber only in response to a pressure in said chamber exceeding said pressure level.

5. A steering assembly according to claim 4 wherein:

said pressurizing means comprise an inlet fitting accessible externally of said steering column for connection to a fluid pressure source.

6. A collapsible steering assembly for automotive vehicles comprising:

a telescoping steering column including normally upper and lower telescoping sections;

non-rebound yieldable total energy dissipating cushioning means operatively connected between said sections for yieldably resisting relative telescoping movement of said sections in a manner such that said cushioning means yields to accommodate relative telescoping movement of said sections in response to impact against said column of a moving mass which produces on said column an impact force at least equal to a predetermined force level;

said cushioning means including means for dissipating a major portion of the impact energy of said mass, such that substantially no energy is stored in any manner whatsoever within said steering assembly following impact and any energy which is not dissipated by the cushioning means and is effectively stored within said steering assembly following impact is insufficient to cause any appreciable rebound extension of said section;

said cushioning means comprise a cylinder connected to one of said sections, a plunger connected to the other section and movable in said cylinder to define with said cylinder a pneumatic chamber which is contracted by relative telescoping movement of said sections, and said chamber being adapted to contain a pneumatic working fluid to be compressed by contraction of said chamber; and pressure relief means for normally retaining a pressure level substantially greater than atmospheric pressure in said chamber and venting working fluid from said chamber only in response to a pressure in said chamber exceeding said pressure level.

7. A steering assembly according to claim 6 including:

means for pressurizing said chamber with a pneumatic working fluid at a given initial fluid pressure level when said sections are fully extended, whereby said working fluid is compressed to a higher pressure level by relative telescoping movement of said sections.

8. A collapsible steering assembly for automotive vehicles comprising:

a telescoping steering column including normally upper and lower telescoping sections;

non-rebound yieldable total energy dissipating cushioning means operatively connected between said sections for yieldably resisting relative telescoping movement of said sections in a manner such that said cushioning means yields to accommodate relative telescoping movement of said sections in response to impact against said column of a moving mass which produces on said column an impact force at least equal to a predetermined force level;

said cushioning means including means for dissipating a major portion of the impact energy of said mass, such that substantially no energy is stored in any manner whatsoever within said steering assembly following impact and any energy which is not dissipated by the cushioning means and is effectively stored within said steering assembly following impact is insufficient to cause any appreciable rebound extension of said sections;

said cushioning means comprise a pressure vessel having an interior pneumatic chamber and an axially compressible wall bounding said chamber and terminally connected to said sections, respectively, whereby said wall is compressed axially to contract said chamber by relative telescoping movement of said sections, and said chamber being adapted to contain a pneumatic working fluid to be compressed by contraction of said chamber; and pressure relief means for normally retaining a pressure level substantially greater than atmospheric pressure in said chamber and venting working fluid from said chamber only in response to a pressure in said chamber exceeding said pressure level.

9. A steering assembly according to claim 8 including: means for pressurizing said chamber with a pneumatic working fluid at a given initial pressure level when said sections are fully extended, whereby said working fluid is compressed to a higher pressure level by relative telescoping movement of said sections.

10. A steering assembly according to claim 8 wherein said pressure vessel comprises a bellow.

11. A steering assembly according to claim 8 wherein said compressible wall comprises a bellows of relatively thin material including axially spaced circumferential folds having adjacent annular sidewalls which are mutually joined along alternate radially inner and outer meeting edges and reinforcing rings surrounding said wall at said inner meeting edges.

12. A steering assembly according to claim 11 wherein said wall is constructed of plastic.

References Cited

UNITED STATES PATENTS

| | | | |
|---|---|---|---|
| 1,744,241 | 1/1930 | Pierle | 92—42 X |
| 2,828,646 | 4/1958 | Farmer | 74—493 |
| 2,828,769 | 4/1958 | Cooper | 92—42 X |
| 2,836,079 | 5/1958 | Salch | 74—493 |
| 2,852,956 | 9/1958 | May | 74—493 |
| 3,016,764 | 1/1962 | Fredericks et al. | 74—552 |

MILTON KAUFMAN, Primary Examiner